United States Patent
Kuwahara et al.

(10) Patent No.: US 8,376,112 B2
(45) Date of Patent: Feb. 19, 2013

(54) DRIVE FORCE TRANSMITTING APPARATUS

(75) Inventors: Takashi Kuwahara, Isehara (JP); Yasuo Takagi, Komae (JP)

(73) Assignee: Nissan Motor Co., Ltd., Yokohama (JP)

( * ) Notice: Subject to any disclaimer, the term of this patent is extended or adjusted under 35 U.S.C. 154(b) by 293 days.

(21) Appl. No.: 12/777,600

(22) Filed: May 11, 2010

(65) Prior Publication Data

US 2010/0288597 A1 Nov. 18, 2010

(30) Foreign Application Priority Data

May 12, 2009 (JP) ................... 2009-115222
Feb. 8, 2010 (JP) ................... 2010-024964

(51) Int. Cl.
*F16D 25/08* (2006.01)
(52) U.S. Cl. .................... 192/85.53; 192/113.5
(58) Field of Classification Search ............. 192/85, 192/85.48, 85.5, 85.54, 85.59, 110.5, 113.5, 192/85.49, 85.51, 85.52, 85.53, 85.61
See application file for complete search history.

(56) References Cited

U.S. PATENT DOCUMENTS 3,230,792 A * 1/1966 Keiley et al. ............... 74/334
4,979,602 A * 12/1990 Fukushima ............ 192/85.51
5,743,370 A * 4/1998 Thomire ................ 192/85.51
6,289,790 B1 * 9/2001 Rey ........................ 92/170.1
2010/0307883 A1 12/2010 Patzner et al.

FOREIGN PATENT DOCUMENTS

CN 101365897 A 2/2009
JP 2006-137406 6/2006

OTHER PUBLICATIONS

An English translation of the Chinese Office Action of corresponding Chinese Application No. 201010172580.4, issued on Oct. 18, 2012.

* cited by examiner

*Primary Examiner* — David D Le
*Assistant Examiner* — Stacey Fluhart
(74) *Attorney, Agent, or Firm* — Global IP Counselors, LLP (57) ABSTRACT

A drive force transmitting apparatus comprises a dry clutch, a hydraulic cylinder, a piston arm, an elastic partitioning member, a first seal member and a leakage lubricating fluid recovery path. The elastic partitioning member prevents lubricating fluid that has leaked from a sliding portion of a piston of the hydraulic cylinder from flowing into the dry clutch. The first seal member is disposed between opposing surfaces of a cylinder housing and a clutch cover at a position downstream from the elastic partitioning member in a leakage flow direction of lubricating fluid that has leaked. The leakage lubricating fluid recovery path is at least partially formed by a gap between the cylinder housing and the clutch cover, such that lubricating fluid leaking past the piston is conveyed to an inside of the transmission while maintaining a sealed state established by the elastic partitioning member and the first seal member.

10 Claims, 5 Drawing Sheets

DRIVE FORCE TRANSMITTING APPARATUS

CROSS-REFERENCE TO RELATED APPLICATIONS

This application claims priority to Japanese Patent Application Nos. 2009-115222, filed on May 12, 2009 and 2010-024964, filed on Feb. 8, 2010. The entire disclosures of Japanese Patent Application Nos. 2009-115222 and 2010-024964 are hereby incorporated herein by reference.

BACKGROUND

1. Field of the Invention

The present invention generally relates to a drive force transmitting apparatus equipped with a dry clutch contrived to be connected and released using hydraulic pressure from a transmission. More specifically, the present invention relates to a drive force transmitting apparatus having a hydraulic fluid leakage recovery path.

2. Background Information

Various vehicles, such as a hybrid vehicle, utilize a drive force transmitting apparatus that includes a clutch hub coupled to an output shaft of an engine, a clutch cover fixed to a rotor of an electric motor and coupled to an input shaft of a transmission, a multiple-plate dry clutch arranged between the clutch hub and the clutch cover, and a slave cylinder (generally called a CSC, which stands for "concentric slave cylinder") that controls connection and release of the multiple-plate dry clutch. The slave cylinder of this type of drive force transmitting apparatus sometimes includes a piston slidably arranged in a cylinder housing. A release bearing is often provided on a tip end of the piston. A diaphragm spring and a pressure plate are arranged between the release bearing and the multiple-plate dry clutch. The connection state of the multiple-plate dry clutch is controlled by using a spring force of the diaphragm spring to put the multiple-plate dry clutch into a connected state and using a hydraulic force of the slave cylinder to put the multiple-plate dry clutch into a released state. On example of this type of drive force transmitting apparatus is disclosed in Japanese Laid-Open Patent Publication No. 2006-137406.

SUMMARY

It has been discovered that in the conventional hybrid drive force transmitting apparatus described above, the slave cylinder is arranged in a position lying between the clutch hub and the engine. Consequently, the slave cylinder is arranged distant from the transmission in an axial direction and it is difficult from a component layout perspective to form a leakage oil recovery path for recovering oil that leaks from a piston sliding portion of the slave cylinder and for returning the recovered oil to the transmission.

More specifically, if the slave cylinder uses a high-pressure operating oil, then it is not possible to completely prevent the operating oil from leaking. Also, in such a drive force transmitting apparatus, a "dry space" exists between the slave cylinder and the transmission. The dry space contains such components as the multiple-plate dry clutch and the electric motor, which are preferably protected from the intrusion of operating oil from an outside source. Consequently, it is necessary to provide a long oil recovery path using a pipe or the like and to route the pipe around an outer perimeter of the housing to avoid the dry space.

The present invention was conceived in view of the aforementioned problem regarding avoiding the dry space. One object is to provide a drive force transmitting apparatus in which it is easier to establish a leakage oil recovery path for recovering oil that leaks from a hydraulic actuator serving to operate a dry clutch and returning the recovered oil to a transmission.

In view of the state of the known technology, one aspect of the present disclosure is to provide a drive force transmitting apparatus that basically comprises a dry clutch, a hydraulic cylinder, a piston arm, an elastic partitioning member, a first seal member and a leakage lubricating fluid recovery path. The dry clutch includes a clutch hub, a first dry frictional holding member mounted on the clutch hub, a clutch cover having a transmission input shaft connecting structure configured to be connected to an input shaft of a transmission, and a second dry frictional holding member mounted on the clutch cover. The hydraulic cylinder includes a piston slidably arranged inside a cylinder bore of a cylinder housing. The hydraulic cylinder controls connection and release of the dry clutch by using hydraulic pressure from the transmission to move the piston. The piston arm is slidably disposed between the piston and the dry clutch such that the piston arm is slidably arranged in a through hole formed in the clutch cover to generate a pressing force in the dry clutch form a pushing force from the piston. The elastic partitioning member is disposed between the piston arm and the dry clutch. The elastic partitioning member prevents lubricating fluid that has leaked from a sliding portion of the piston arm from flowing into the dry clutch. The first seal member is disposed downstream from the elastic partitioning member in a leakage flow direction of lubricating fluid that has leaked past the piston. The first seal member seals between opposing surfaces of the cylinder housing and the clutch cover. The leakage lubricating fluid recovery path is at least partially formed by a gap between the cylinder housing and the clutch cover, such that lubricating fluid leaking past the piston is conveyed to an inside of the transmission while maintaining a sealed state established by the elastic partitioning member and the first seal member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
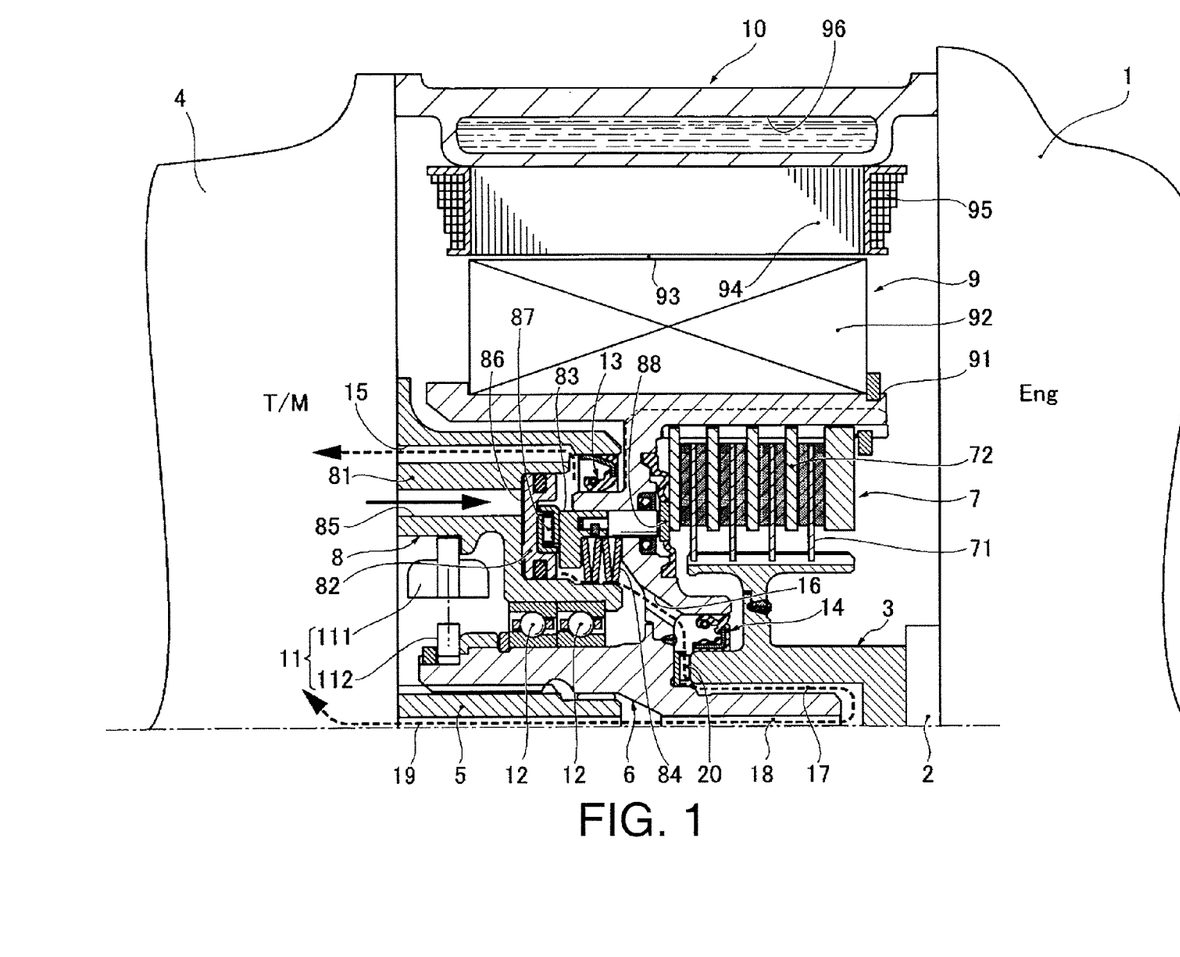
FIG. 1 is a full schematic cross sectional view of a hybrid drive force transmitting apparatus according to a first embodiment.

Referring initially to FIGS. 1 to 4, a hybrid drive force transmitting apparatus is illustrated in accordance with a first embodiment. As shown in FIG. 1, the hybrid drive force transmitting apparatus according to the first embodiment basically includes an engine 1, a crankshaft 2, a clutch hub 3, a transmission 4, a transmission input shaft 5, a clutch cover 6, a multiple-plate dry clutch 7, a slave (hydraulic) cylinder 8 and a motor/generator 9. Except for the engine 1 and the transmission 4, the component parts of the apparatus are arranged inside a motor/clutch housing 10 so as to form a motor unit.

When the multiple-plate dry clutch 7 (which is normally open) is in a released (open) state, the hybrid drive force transmitting apparatus is in an electric car mode. In the electric car mode, the motor/generator 9 is connected to the transmission input shaft 5 through the clutch cover 6. Conversely, when the multiple-plate dry clutch 7 is in a connected (closed) state using hydraulic pressure by the slave cylinder 8, the hybrid drive force transmitting apparatus is in a hybrid car mode in which both the engine 1 and the motor/generator 9 are connected to the transmission input shaft 5 through the clutch cover 6.

Figure 2:
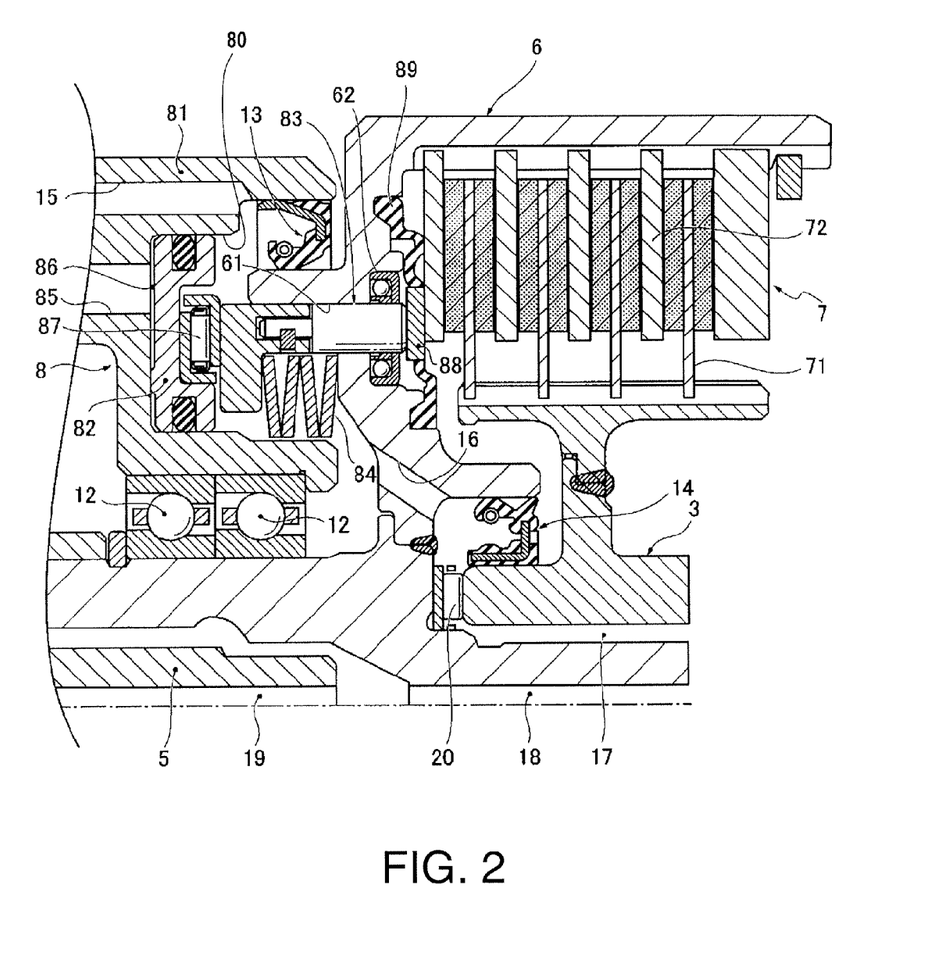
FIG. 2 is an enlarged, partial cross sectional view of a portion of the hybrid drive force transmitting apparatus according illustrated in FIG. 1.

As shown in FIGS. 1 and 2, the multiple-plate dry clutch 7 has a plurality of drive plates 71 and driven plates 72 arranged in an alternating fashion between the clutch hub 3 and the clutch cover 6. The clutch hub 3 is connected to the engine 1 via the crankshaft 2. In this illustrated embodiment, the drive plates 71 of the multiple-plate dry clutch 7 are each non-rotatably held on the clutch hub 3 with a spline connection. The clutch cover 6 is connected to the input shaft 5 of the transmission 4. In this illustrated embodiment, the driven plates 72 of the multiple-plate dry clutch 7 are each non-rotatably held on the clutch cover 6 with a spline connection. The drive plates 71 of the multiple-plate dry clutch 7 constitute a first dry frictional holding member, while the driven plates 72 of the multiple-plate dry clutch 7 constitute a second dry frictional holding member. Thus, torque can be transmitted between the clutch hub 3 and the clutch cover 6 when the multiple-plate dry clutch 7 is in a connected state, and torque cannot be transmitted between the clutch hub 3 and the clutch cover 6 when the multiple-plate dry Clutch 7 is in a released state.

The slave cylinder 8 serves as a hydraulic actuator for controlling the connection and release of the multiple-plate dry clutch 7. The slave cylinder 8 is arranged in a position between the transmission 4 and the clutch cover 6. The slave cylinder 8 includes a hydraulic cylinder that preferably uses lubricating fluid (e.g., hydraulic oil) from the transmission 4. As shown in FIGS. 1 and 2, the hydraulic cylinder includes a cylinder bore 80 formed in a cylinder housing 81, a piston 82 and a piston arm 83. The piston 82 is slidably arranged in the cylinder bore 80 of the cylinder housing 81 such that piston 82 can move in a sliding fashion. The piston arm 83 is arranged in a position between the piston 82 and the multiple-plate dry clutch 7. As shown in FIGS. 1 and 2, the cylinder housing 81 has a clutch hydraulic oil (lubricating fluid) passage 85 and a cylinder oil (lubricating fluid) chamber 86. The clutch hydraulic oil passage 85 conveys clutch pressure produced by the transmission 4, while the cylinder oil chamber 86 communicates with the clutch hydraulic oil passage 85.

The piston arm 83 is arranged such that it can move in a sliding fashion inside a through hole 61 formed in the clutch cover 6, as shown in FIG. 2. The piston arm 83 serves to generate a pressing force in the multiple-plate dry clutch 7 in response to a pushing force from the slave cylinder 8.

In addition to the piston arm 83, a needle bearing 87, a return spring 84, and a pressure plate 88 are arranged between the piston 82 and the multiple-plate dry clutch 7, as shown in FIG. 2. As shown in FIG. 2, the needle bearing 87 is arranged between the piston 82 and the piston arm 83. The needle bearing 87 serves to prevent the piston 82 from being rotated when the piston arm 83 rotates. As shown in FIG. 2, the return spring 84 comprises a plurality of Belleville springs arranged between the piston arm 83 and the clutch cover 6. The pressure plate 88 is provided as an integral unit with an elastic support plate 89, as shown in FIG. 2, so as to be elastically supported in the clutch cover 6. The pressure plate 88 and the elastic support plate 89 constitute an elastic partitioning member serving to prevent oil (lubricating fluid) that has leaked from a sliding portion of the piston arm 83 from flowing to the multiple-plate dry clutch 7. More specifically, the pressure plate 88 and the elastic support plate 89 are fixed in a sealed fashion to the clutch cover 6 in a position where the piston arm 83 is installed. The pressure plate 88 and the elastic support plate 89 function to separate (partition) a "wet space" in which the slave cylinder 8 is arranged from a "dry space" in which the multiple-plate dry clutch 7 is arranged.

Figure 3:
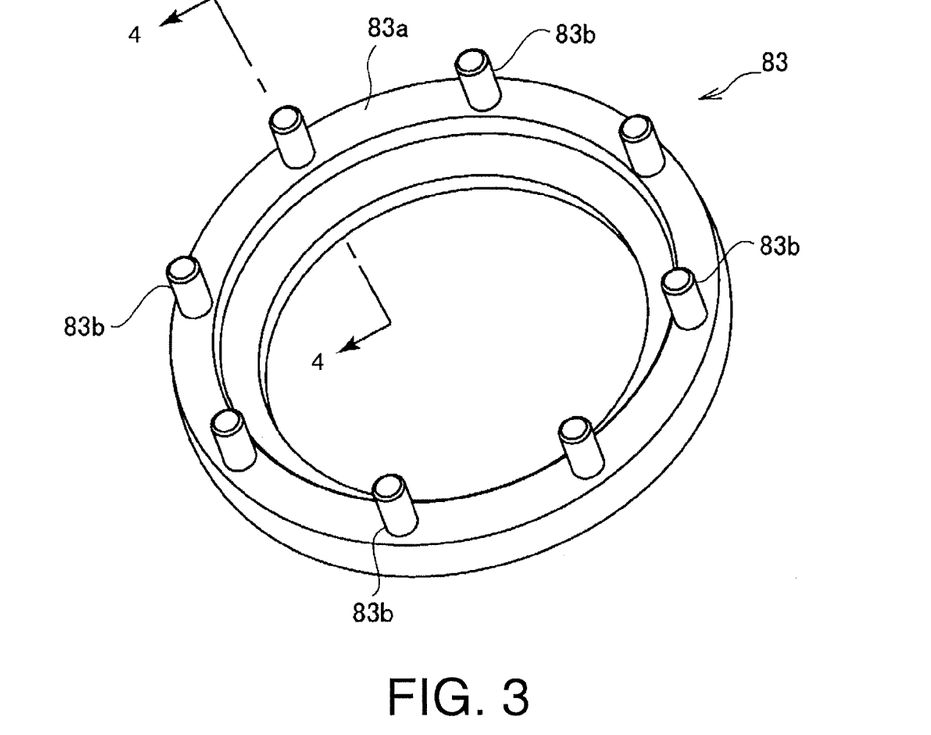
FIG. 3 is a perspective view of a piston arm of the hybrid drive force transmitting apparatus illustrated in FIGS. 1 and 2.
Figure 4:
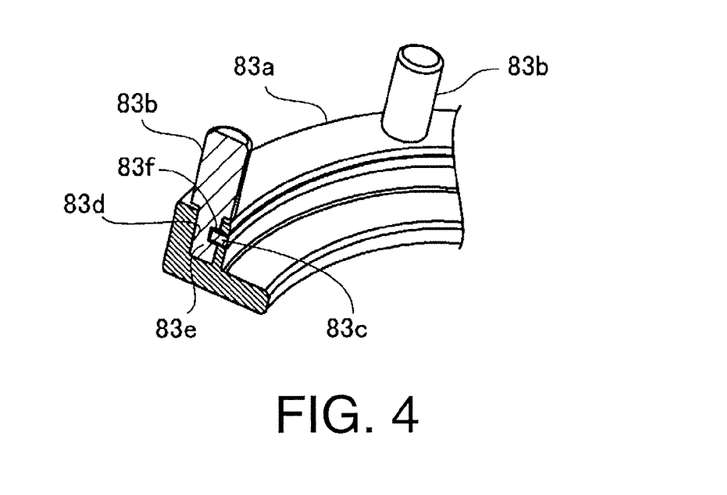
FIG. 4 is a enlarged, partial cross sectional view of the piston arm of the hybrid drive force transmitting apparatus illustrated in FIGS. 1 and 2 as seen along section line 4-4 of FIG. 3.

As shown in FIGS. 3 and 4, the piston arm 83 includes ring-shaped arm body 83a, a plurality of protruding arm pins 83b and a snap ring 83c. The arm pins 83b are arranged on the arm body 83a in a circular arrangement. The snap ring 83c serves to fasten the arm pins 83b to the arm body 83a. When assembling the piston arm 83, a pin leg 83e of each of the arm pins 83b is inserted into one of a plurality of pin holes 83d formed in the arm body 83a. Each of the arm pins 83b is rotated such that a ring fitting groove 83f formed in the pin leg 83e faces toward a center position of the arm body 83a. The snap ring 83c is then compressed to a smaller diameter and inserted within an internal surface of the ring body 83a. The snap ring 83c is then released such that it is allowed to expand due to an elastic recovery force. In this way, the snap ring 83c is made to fit into the ring fitting grooves 83f, and thereby, secure all of the arm pins 83b to the arm body 83a simultaneously. As shown in FIG. 2, the clutch cover 6 includes a plurality of through holes 61. The through holes 61 are arranged and configured such that the arm pins 83b can pass therethrough. A seal bearing 62 is provided in a position on the clutch side of each of the through holes 61.

The motor/generator 9 is a synchronous AC electric motor. As shown in FIG. 1, the motor/generator 9 includes a rotor support frame 91, a motor rotor 92, a motor stator 94 and a stator coil 95. The rotor support frame 91 is formed integrally with the clutch cover 6 such that the rotor support frame 91 and the clutch cover 6 are formed as a one-piece, unitary member. The motor rotor 92 is fixedly supported on the rotor support frame 91. The motor rotor 92 has a plurality of permanent magnets imbedded therein. The motor stator 94 is fixed to the motor/clutch housing 10 and arranged such that an air gap 93 exists between the motor stator 94 and the motor rotor 92. The stator coil 95 is wound onto the motor stator 94. A water jacket 96 is formed in the motor/clutch housing 10. The water jacket 96 serves to allow a coolant to flow therethrough for cooling the motor rotor 92.

As shown in FIG. 1, a resolver 11 is provided to detect a rotational angle of the motor/generator 9. The resolver 11 includes a resolver stator 111 and a resolver rotor 112. The resolver stator 111 is fixed to the cylinder housing 81. The resolver rotor 112 is fixed to the clutch cover 6 in a position facing opposite the resolver stator 11.

As shown in FIG. 1, the leakage oil recover path of the first embodiment includes a pair of first bearings 12, a first seal member 13 and a first recovery passage 15. Also as shown in FIG. 1, in the first embodiment, the slave cylinder 8 is arranged in close proximity to the transmission 4 and the same operating oil (lubricating fluid) is used for both the transmission 4 and the slave cylinder 8. A portion of the leakage oil (lubricating fluid) recovery path is formed by a gap between the cylinder housing 81 and the clutch cover 6. The leakage oil (lubricating fluid) recover path is a circuit through which oil (lubricating fluid) that has leaked from a sliding portion of the piton 81 is conveyed to the inside of the transmission 4 while maintaining a sealed state between the elastic partitioning member (the pressure plate 88 and the elastic support plate 89) and the first seal member 13.

The first bearings 12 serve to rotatably support the clutch cover 6 with respect to the cylinder housing 81. In the first embodiment, the first bearings 12 are provided in order to prevent the clutch cover 6 from becoming slanted with respect to a rotational center axis. Furthermore, nothing other than the first bearings 12 are arranged between the cylinder housing 81 and the clutch cover 6 in order to prevent the center axis of the clutch cover 6 from deviating from a center axis of the cylinder housing 81.

As shown in FIGS. 1 and 2, the first seal member 13 is arranged downstream from the elastic partitioning member (the pressure plate 88 and the elastic support plate 89) in a leakage oil (lubricating fluid) flow direction. The first seal member 13 serves to form a seal between the opposing surfaces of cylinder housing 81 (stationary member) and the clutch cover 6 (rotating member). The first seal member 13 has a lip seal structure configured to exhibit a seal function that utilizes the elasticity of the seal material of the first seal member 13. A stable sealing performance is ensured by utilizing the first bearings 12 to suppress deviation of the center axis of the clutch cover 6.

As shown in FIGS. 1 and 2, the first oil (lubricating fluid) recovery passage 15 is formed downstream of the first seal member 13 of the cylinder housing 81. A gap across which the cylinder housing 81 faces the clutch cover 6 is positioned upstream of the first seal member 13 and forms a portion of the leakage oil (lubricating fluid) recovery path. In this way, the leakage oil recovery path of the first embodiment returns oil that has leaked from a sliding portion of the piston 82 to the transmission 4 by passing the leaked oil through the gap between the cylinder housing 81 and the clutch cover 6 (which is sealed by the first seal member 13) and through the first oil recovery passage 15.

In the first embodiment, as shown in FIG. 1, a bearing lubricating oil path includes a needle bearing 20 (a second bearing), a second seal member 14, a first axial oil passage 19, a second axial oil passage 18 and a lubricating oil passage 16. The bearing lubricating oil path serves to lubricate the first bearings 12 (which rotatably support the clutch cover 6 with respect to the cylinder housing 81) the needle bearing 20, and a needle bearing 87 (a third bearing) arranged between the piston 82 and the piston arm 83 by taking bearing lubricating oil from the transmission 4, passing it through the bearings, and returning the lubricating oil to the transmission 4.

The needle bearing 20 is installed between a surface of the clutch hub 3 and a surface of the clutch cover 6 that face opposite each other along an axial direction, as shown in FIGS. 1 and 2. The needle bearing 20 serves to suppress reciprocal motion of the clutch hub 3 and the clutch cover 6 in an axial direction while permitting relative rotation between the clutch hub 3 and the clutch cover 6.

As shown in FIGS. 1 and 2, the second seal member 14 is disposed between the clutch hub 3 and the clutch cover 6. The second seal member 14 serves to prevent bearing lubricating oil from flowing into the dry space in which the multiple-plate dry clutch 7 is arranged from the wet space in which the slave cylinder 8 is arranged.

The first axial oil passage 19 is formed in the transmission input shaft 5 at a position coinciding with a center axis of the transmission input shaft 5. The second axial oil passage 18 is formed in the clutch cover 6 and arranged to communicate with the first axial oil passage 19. The lubricating oil passage 16 is formed in the clutch cover 6. The lubricating oil passage 16 communicates with the second axial oil passage 18 through the needle bearing 20 and a gap 17 between the clutch hub 3 and the clutch cover 6.

Operational effects of the first embodiment will now be explained.

First, problems existing in a comparative example will be explained. Then, operational effects that the first embodiment exhibits in a hybrid drive force transmitting apparatus will be explained in relation to control of the clutch by the slave cylinder, recovery of oil that has leaked from the slave cylinder, lubrication of the bearings, and the establishment of a leakage oil recovery path.

Figure 5:
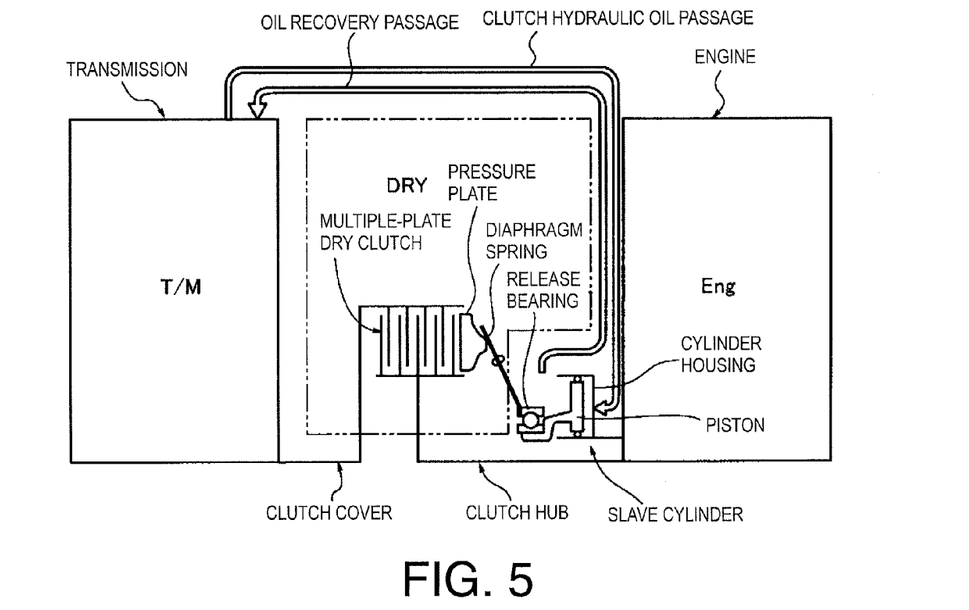
FIG. 5 is a simple schematic view of a basic structure of a hybrid drive force transmitting apparatus according to a comparative example.

Problems encountered in the comparative example will now be explained. As shown in FIG. 5, a hybrid drive force transmitting apparatus according to the comparative example includes a clutch hub coupled to an output shaft of an engine, a clutch cover fixed to a rotor of an electric motor and coupled to an input shaft of a transmission, a multiple-plate dry clutch arranged between the clutch hub and the clutch cover, and a slave cylinder contrived to control connection and release of the multiple-plate dry clutch.

The slave cylinder of the comparative example includes a piston arranged such that it can move in a sliding fashion in a cylinder housing. Also a release bearing is provided on a tip end of the piston, with a diaphragm spring and a pressure plate being arranged between the release bearing and the multiple-plate dry clutch. The connection state of the multiple-plate dry clutch is controlled by using a spring force of the diaphragm spring to put the multiple-plate dry clutch into a connected state and using a hydraulic force of the slave cylinder to put the multiple-plate dry clutch into a released state.

In a hybrid drive force transmitting apparatus according to the comparative example, the slave cylinder is arranged in a position between the clutch hub and the engine. More specifically, the parts arranged in the following order: engine→slave cylinder→clutch hub→multiple-plate dry clutch→clutch cover→transmission. Consequently, the clutch hub, the multiple-plate dry cylinder, and the clutch cover are arranged between the slave cylinder and the transmission such that the slave cylinder and the transmission are comparatively distant from each other. As a result, it is difficult from a layout standpoint to establish a leakage oil recovery path through which oil that has leaked from a piston sliding portion of the slave cylinder can be recovered and returned to the transmission.

More specifically, if the slave cylinder uses a high-pressure operating oil (lubricating fluid), then it is not possible to completely prevent the operating oil from leaking. Also, in such a drive force transmitting apparatus, a "dry space" exists between the slave cylinder and the transmission. The dry space contains such components as the multiple-plate dry clutch and an electric motor (not shown in the figure), which are preferably protected from the intrusion of an operating oil from an outside source. Therefore, in order to supply hydraulic pressure from the transmission to the slave cylinder for controlling the dry clutch, it is necessary to route a long clutch hydraulic oil passage comprising a pipe or the like around an outer perimeter of the housing so as to avoid the dry space. Similarly, in order return oil that has leaked from the slave cylinder to the transmission, it is necessary to route a long oil recovery passage comprising a pipe or the like around an outer perimeter of the housing so as to avoid the dry space.

Operational effects of the embodiment related to controlling connection and release of the multiple-plate dry clutch 7 using the slave cylinder 8 will now be explained using FIGS. 1 and 2. When the multiple-plate dry clutch 7 is put into a connected state by the slave cylinder 8, a clutch hydraulic pressure generated by the transmission 4 is supplied to the cylinder oil chamber 86 through the clutch hydraulic oil chamber 85 formed in the cylinder housing 81. A hydraulic force equal to the product of the hydraulic pressure and a surface area receiving the hydraulic pressure acts on the piston 82 and causes the piston 82 to stroke (move) in a direction corresponding to the rightward direction in FIGS. 1 and 2 against the spring force of the return spring 84 arranged between the piston arm 83 and the clutch cover 6. As a result, a connecting force equal to a difference between the hydraulic force and the spring force is transmitted from the piston 82 to the pressure plate 88 through the needle bearing 87 and the piston arm 83 and the drive plate 71 is pressed against the driven plate 72, causing the multiple-plate dry clutch 7 to enter a connected state.

When the multiple-plate dry clutch 7 is released from a connected state, the operating oil supplied to the cylinder oil chamber 86 is drained to the transmission 4 through the clutch hydraulic oil passage 85. As the hydraulic force acting on the piston 82 decreases, the spring force of the return spring 84 eventually exceeds the hydraulic force and causes the piston arm 83 to stroke in a direction corresponding to the leftward direction in FIGS. 1 and 2. As a result, the connecting force transmitted to the pressure plate 88 is eliminated and the multiple-plate dry clutch 7 is released.

As mentioned previously, since the multiple-plate dry clutch is controlled to a connected state by supplying a high clutch hydraulic pressure to the cylinder oil chamber 86 of the slave cylinder 8, it is not possible to avoid leakage of the operating oil from a sliding portion of the piston 82. Consequently, it is necessary to provide a leakage oil recovery path for recovering leaked operating oil and returning it to the transmission 4.

Operational effects of the embodiment related to recovering oil that has leaked from the slave cylinder 8 will now be explained. When the clutch cover 6 is rotating (e.g., when a vehicle in which the apparatus is installed is moving), operating oil that leaks from a sliding portion of the piston 82 moves radially outward due centrifugal force acting on the leaked oil. However, the radially outwardly moving oil is prevented from intruding into the dry space in which the motor/generator 9 and the multiple-plate dry clutch 7 are arranged, as shown in a comparatively upper portion of FIG. 1 with a dotted-line arrow, because of the sealing action of the first seal member 13 arranged between the cylinder housing 81 and the clutch cover 6. Furthermore, as indicated with the dotted-line arrow in a comparatively upper portion of FIG. 1, the leaked oil returns to the transmission after passing through a gap between the cylinder housing 81 and the clutch cover 6 and the first oil recovery passage 15 formed in the cylinder housing 81. Thus, oil that leaks from a sliding portion of the piston 82 of the slave cylinder 8 can be returned to the transmission 4 while being prevented from entering the dry space where the multiple-plate dry clutch 7 and the motor/generator 9 are arranged.

A hybrid drive force transmitting apparatus according to the first embodiment has the needle bearing 20, the first bearings 12, and the needle bearing 87. When the vehicle in which the apparatus is installed travels, the multiple-plate clutch 7 is connected and released repeatedly and large forces act on these bearings. Thus, it is necessary to lubricate the bearings in order to suppress frictional heating and enable the bearings to accomplish a smooth support function.

Operational effects of the first embodiment related to lubricating the bearings 20, 12, 23, and 87 provided in the wet space of a hybrid drive force transmitting apparatus will now be explained. When the vehicle is traveling, the transmission 4 produces a bearing lubricating oil and the bearing lubricating oil passes through the first axial oil passage 19, the second axial oil passage 18, the gap 17, the needle bearing 20 as indicated with a solid-line arrow in FIG. 1. The lubricating oil then passes through a gap sealed by the second seal member 14 and into the lubricating oil passage 16. At a position corresponding to an outlet of the lubricating oil passage 16, the flow of lubricating oil branches into two paths. One of the paths passes through the first bearings 12 and returns to the transmission 4. The other path leads through the needle bearing 87, a gap between the cylinder housing 81 and the clutch cover 6 that is sealed by the first seal member 13, and the first oil recovery passage 15 formed in the cylinder housing 81, and then returns to the transmission 4.

Thus, bearing lubricating oil produced by the transmission 4 can be supplied to lubricate the needle bearing 20, the first bearings 12, and the needle bearing 87 while being prevented from entering the dry space in which the multiple-plate dry clutch 7 and the motor/generator 9 are arranged. Additionally, the leakage oil recovery path is utilized for returning the bearing lubricating oil to the transmission 4. As a result, a bearing lubricating structure can be accomplished more simply and oil that leaks from a sliding portion of the piston 82 can be returned to the transmission 4 quickly along with the bearing lubricating oil.

Figure 6:
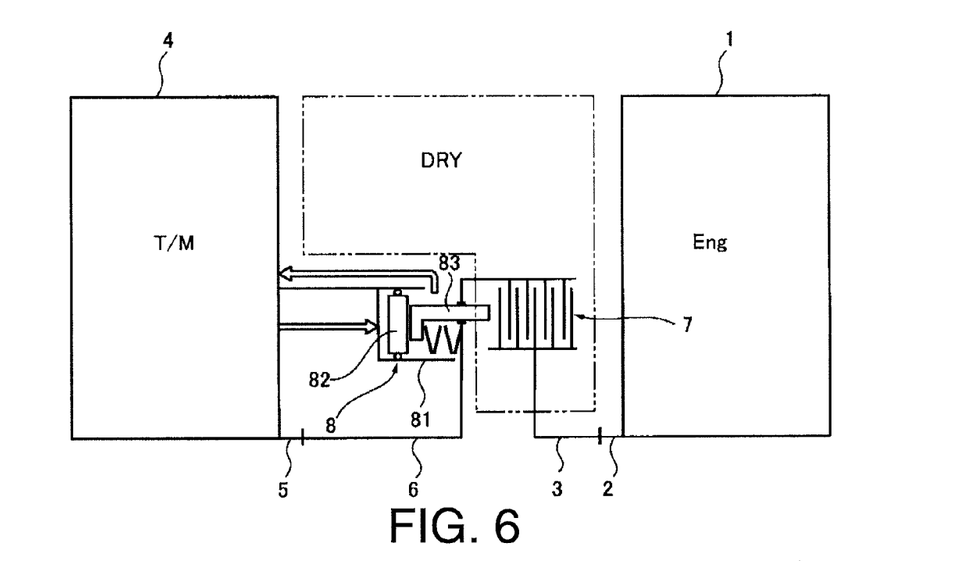
FIG. 6 is a simple schematic view of a basic structure of the hybrid drive force transmitting apparatus illustrated in FIGS. 1 and 2.

FIG. 6 is a simple schematic view showing a basic structure of the hybrid drive force transmitting apparatus according to the first embodiment. Operational effects of the first embodiment related to the establishment of a leakage oil recovery path will now be explained. As shown in FIG. 6, a hybrid drive force transmitting apparatus according to the first embodiment includes the clutch hub 3 coupled to the crankshaft 2 of the engine 1, the clutch cover 6 coupled to the input shaft 5 of the transmission 4, the multiple-plate drive clutch 7 arranged between the clutch hub 3 and the clutch cover 6, and the slave cylinder 8 contrived to control connection and release of the multiple-plate dry clutch 7. Additionally, in the first embodiment, the slave cylinder 8 comprises the cylinder housing 81, the piston 82 slidably arranged inside the cylinder housing 82, and the piston arm 83 arranged to pass through the clutch cover 6. Consequently, a layout can be achieved in which the slave cylinder 8 is arranged between the transmission 4 and the clutch cover 6.

By arranging the slave cylinder 8 in a position between the transmission 4 and the clutch cover 6, the parts can be arranged in the following order, as shown in FIG. 6: the engine 1→the clutch hub 3→the multiple-plate dry clutch 7→the clutch cover 6→the slave cylinder 8→the transmission 4. Thus, the slave cylinder 8 is closely adjacent to the transmission 4. As a result, hydraulic pressure for operating the clutch can be supplied from the transmission 4 to the slave cylinder 8 by merely forming a clutch hydraulic oil passage 85 having a short passage length in the cylinder housing 81.

Similarly, a leakage oil recovery path for returning leaked oil to the transmission 4 and a bearing lubricating oil path for returning bearing lubricating oil to the transmission 4 can be established with a simpler structure. More specifically, the first seal member 13 and the second seal member 14 serve to prevent the leaked oil and bearing lubricating oil from reaching the dry space, and the leaked oil and bearing lubricating oil are returned to the transmission 4 using a simple structure comprising the oil passages 15, 16, 18 and 19 and the gap 17. As a result, unlike the comparative example, it is not necessary to provide a long leakage oil recovery path or a long bearing lubricating oil path and the leakage oil recovery path and bearing lubricating oil path can be established more easily.

Effects that can be obtained with a hybrid drive force transmitting apparatus according to the first embodiment are explained below in list form.

(1) A hybrid drive force transmitting apparatus according to the first embodiment basically includes a dry clutch (e.g., the multiple-plate dry clutch 7), a hydraulic cylinder (e.g., the slave cylinder 8), an elastic partitioning member (e.g., the pressure plate 88 and the elastic support plate 89), a first seal member 13 and a leakage oil recovery path (e.g., the first oil recovery passage 15). The dry clutch includes a first dry frictional holding member (e.g., the drive plate 71) held in the clutch hub 3, the clutch cover 6 coupled to the input shaft 5 of the transmission 4, and the second dry frictional holding member (e.g., the driven plate 72). The hydraulic cylinder is arranged in a position adjacent to the transmission 4. The hydraulic cylinder basically includes the cylinder housing 81 having the cylinder bore 80 formed therein and the piston 82 arranged such that it can move in a sliding fashion inside the cylinder bore 80. The hydraulic cylinder is contrived to use hydraulic pressure from the transmission 4 to control connection and release of the dry clutch. The piston arm 83 is arranged in a position between the piston 82 and the dry clutch and contrived such that it can move in a sliding fashion in a through hole 61 formed in the clutch cover 6 and generate a pressing force in the dry clutch utilizing a pushing force from the piston 82. The elastic partitioning member is arranged in a position between the piston arm 83 and the dry clutch and serves to prevent oil that has leaked from a sliding portion of the piston arm 83 from flowing into the dry clutch. The first seal member 13 is arranged in a position downstream of the elastic partitioning member in a flow direction of leaked oil and serves to form a seal between opposing surfaces of the cylinder housing 81 and the clutch cover 6. A portion of the leakage oil recovery path is formed by a gap between the cylinder housing 81 and the clutch cover 6 and at least oil leaking from a sliding portion of the piston 82 is conveyed to an inside of the transmission 4 while maintaining a sealed state established by the elastic partitioning member and the first seal member 13. As a result, a leakage oil recovery path for recovering oil that has leaked from a hydraulic actuator (i.e., the piston 82 and the piston arm 83) serving to operate the dry clutch (multiple-plate dry clutch 7) and returning the recovered oil to the transmission 4 can be established easily.

(2) In the first embodiment, the first bearings 12 are provided to rotatably support the clutch cover 6 with respect to the cylinder housing 81 and the leakage oil recovery path has a first oil recovery passage 15 formed in the cylinder housing 81. Oil that leaks from a sliding portion of the piston 82 passes through a gap between the cylinder housing 81 and the clutch cover 6 and through the first oil recovery passage 15 and is returned to the transmission 4. In addition to the effect described in (1) above, the support action provided by the first bearings 12 helps prevent a rotational center axis of the clutch cover 6 from deviating with respect to a rotational center axis of the cylinder housing 81 and can improve the seal performance of the first seal member 13, which serves to prevent oil leaking from a gap between the cylinder housing 81 and the clutch cover 6 from entering a dry space in which the dry clutch (e.g., the multiple-plate dry clutch 7) is arranged.

(3) A second bearing (needle bearing 20) is provided between axially opposing surfaces of the clutch hub 3 and the clutch cover 6 and the second seal member 14 is provided between the clutch hub 3 and the clutch cover 6. In this way, a bearing lubricating oil path for bearing lubrication is established in which bearing lubricating oil from the transmission 4 passes through the second bearing, the first bearings 12 rotatably supporting the clutch cover 6 with respect to the cylinder housing 81, and a third bearing (e.g., the needle bearing 87) arranged between the piston 82 and the piston arm 83 before being returned to the transmission 4. In addition to the effects described in (1) and (2) above, the second bearing (e.g., the needle bearing 20) improves the sealing performance of the second seal member 14 and the second bearing (needle bearing 20), the first bearings 12, and the third bearing (e.g., the needle bearing 87) can be lubricated with a bearing lubricating oil from the transmission 4.

(4) The bearing lubricating oil path includes the first axial oil passage 19 formed in the transmission input shaft 5, the second axial oil passage 18 formed in the clutch cover 6 and arranged to communicate with the first axial oil passage 19, and the lubricating oil passage 16 that is formed in the clutch cover 6 and communicates with the second axial oil passage 18 through the second bearing (needle bearing 20) and the gap 17 between the clutch hub 3 and the clutch cover 6. Thus, in addition to the effects described in (3) above, a bearing lubricating oil passage can be established with a simple structure that utilizes a leakage oil recovery path for returning leaked oil to the transmission 4, the bearing lubricating oil path including the first axial oil passage 19, the second axial oil passage 18, and the lubricating oil passage 16.

(5) The hydraulic pressure cylinder (e.g., the slave cylinder 8) is arranged in a position close to the transmission 4 and the same operating oil is shared by both the transmission 4 and the hydraulic cylinder. Thus, in addition to the effects described in (1) to (4), the structure of the leakage oil recovery path for returning operating oil to the transmission 4 and the structure of the bearing lubricating oil path can be simplified. More specifically, if the transmission operating oil and the cylinder operating oil were different and separate oil paths were used, then operating oil that has leaked from the cylinder and bearing lubricating oil would have to be returned to cylinder operating oil tank. With this embodiment, however, it is not necessary to provide a cylinder operating oil tank and the leakage oil and the bearing lubricating oil can be returned to an existing transmission working oil tank.

Figure 7:
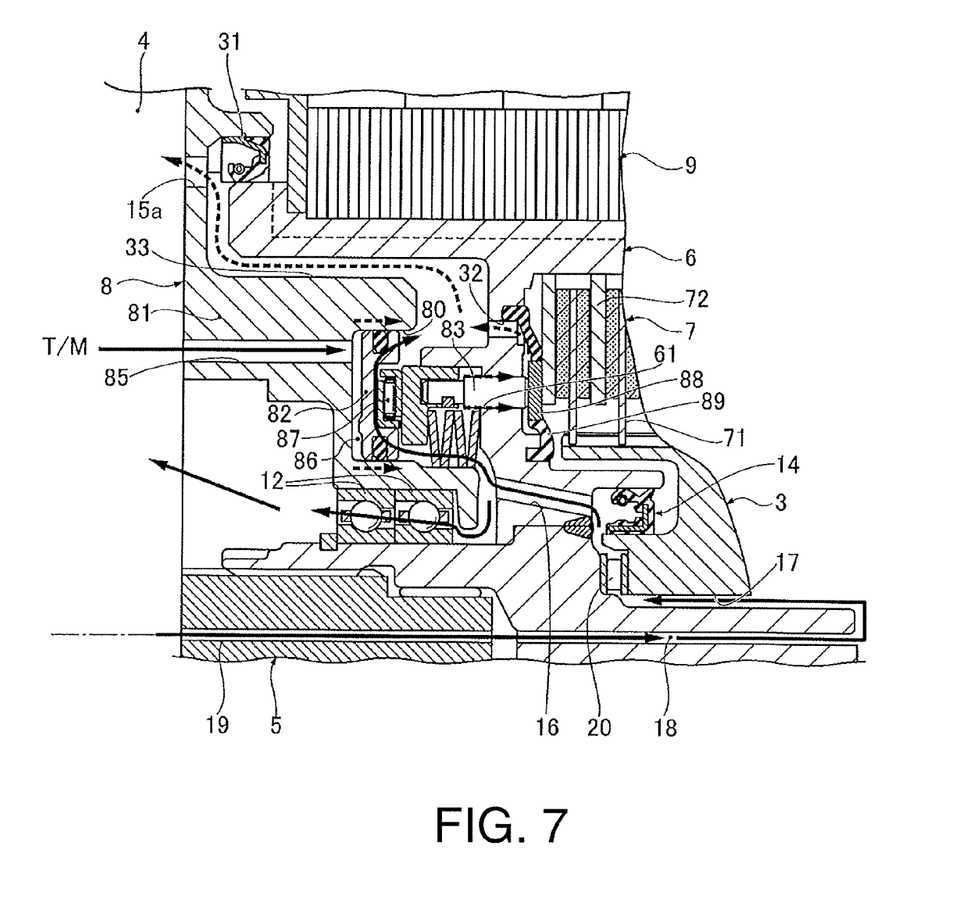
FIG. 7 is an enlarged, partial cross sectional view of a portion of a hybrid drive force transmitting apparatus according to a second embodiment.

Referring now to FIG. 7, a drive force transmitting apparatus in accordance with a second embodiment will now be explained. In view of the similarity between the first and second embodiments, the parts of the second embodiment that are identical in function to the parts of the first embodiment will be given the same reference numerals as the parts of the first embodiment. Moreover, the descriptions of the parts of the second embodiment that are identical to the parts of the first embodiment may be omitted for the sake of brevity. In this second embodiment, the seal bearing 62 provided in the first embodiment for suppressing the leakage of oil from a sliding portion of the piston arm 83 is eliminated in order to shorten the axial dimension of the motor unit (which has an internal clutch).

First, the constituent features of the apparatus will be explained. FIG. 7 is a cross sectional view showing main parts of the drive force transmitting apparatus according to a second embodiment. As shown in FIG. 7, the leakage oil recover path of the second embodiment includes the first bearings 12, the first seal member 31, the first oil recovery passage 15a, the second oil recovery passage 33, and the leakage oil passage 32. Since the seal bearing 62 of the first embodiment is eliminated, an oil recovery passage for recovering oil that leaks from the sliding portion of the piston arm 83 and returning the recovered oil to the transmission 4 is added to the leakage oil recovery path, which is otherwise basically the same as the first embodiment.

The leakage oil recovery path is a circuit contrived to recover oil that has leaked from a sliding portion of the piston 82 to the transmission 4 by passing the recovered oil through a second oil recovery passage 33 that is sealed by a first seal member 31 and through a first oil recovery passage 15a. Additionally, the circuit is also configured to recover oil that leaks from the sliding portion of the piston arm 83 and returned the recovered oil to the transmission 4 by passing it through a leakage oil passage 32 that is sealed by an elastic partitioning member (e.g., the pressure plate 88 and the elastic support plate 89), the second oil recovery passage 33 sealed by the first seal member 31 and the first oil recovery passage 15a.

The first bearings 12 serve to rotatably support the clutch cover 6 with respect to the cylinder housing 81. In the second embodiment, similarly to the first embodiment, the first bearings 12 is provided in order to prevent the clutch cover 6 from becoming slanted with respect to a rotational center axis. Furthermore, nothing other than the first bearings 12 is arranged between the cylinder housing 81 and the clutch cover 6 in order to prevent the center axis of the clutch cover 6 from deviating from a center axis of the cylinder housing 81.

As shown in FIG. 7, the first seal member 31 is arranged downstream from the elastic partitioning member (e.g., the pressure plate 88 and the elastic support plate 89) in a leakage oil flow direction and serves to form a seal between the opposing surfaces of cylinder housing 81 (e.g., the stationary member) and the clutch cover 6 (e.g., the rotating member). The first seal member 31 has a lip seal structure contrived to exhibit a seal function utilizing the elasticity of the seal material, and a stable sealing performance is ensured by utilizing the first bearings 12 to suppress deviation of the center axis of the clutch cover 6.

As shown in FIG. 7, the first oil recovery passage 15 is arranged downstream of the first seal member 31 of the cylinder housing 81 and is shorter than in the first embodiment. A longer oil passage on an upstream side of the first seal member 31 is formed by a gap between the cylinder housing 81 and the clutch cover 6.

The second oil recovery passage 33 is formed by a gap between the cylinder hosing 81 and the clutch cover 6. The first seal member 31 and the first oil recovery passage 15a are arranged in positions located radially outward from sliding portions of the piston 82 and the piston arm 83. Thus, the second oil recovery passage 33 is arranged to extend generally in a radially outward direction from the sliding portions of the piston 82 and the piston arm 83.

As shown in FIG. 7, the leakage oil passage 32 is configured to pass through the clutch cover 6 and communicate with both the second oil recovery passage 33 and a space that is sealed off by the elastic partitioning member (e.g., the pressure plate 88 and the elastic support plate 89). Otherwise, the constituent features of the second embodiment are the same as those of the first embodiment and corresponding parts are indicated with the same reference numerals.

An operational effect of the second embodiment related to recovering oil that has leaked from the slave cylinder will now be explained. The apparatus is configured such that the multiple-plate dry clutch 7 is connected by supplying a high-pressure clutch hydraulic pressure to the cylinder oil chamber 86 of the slave cylinder 8. Consequently, it is not possible to avoid leakage of the operating oil from a sliding portion of the piston 82 due to such causes as deformation of a piston seal.

Although the first embodiment has the seal bearing 62 serving to suppress the leakage of oil from a sliding portion of the piston arm 83, the seal bearing 62 is omitted in the second embodiment. Consequently, a portion of the operating oil flowing through the second oil recovery passage 33 inevitably penetrates into a sliding portion of the piston arm 83 and leaks into a space that is sealed off by the elastic partitioning member (e.g., the pressure plate 88 and the elastic support plate 89). Thus, it is necessary to provide both a leakage oil recovery path for returning operating oil that has leaked from a sliding portion of the piston 82 to the transmission 4 and a leakage oil recovery path for returning operating oil that has leaked from a sliding portion of the piston arm 83 to the transmission 4.

Operational effects of the second embodiment related to recovering operating oil that has leaked from sliding portions of the piston 82 as well as operational effects recovering operating oil that has leaked from a sliding portion of the piston arm 83 will now be explained.

First, operational effects related to recovering operating oil that has leaked from a sliding portion of the piston 82 will be explained. When the clutch cover 6 is rotating, such as when the vehicle is being driven, a centrifugal force acts on operating oil that leaks from a sliding portion of the piston 82 of the slave cylinder 8. The centrifugal force causes the leaked oil to move in a radially outward direction through the second oil recovery passage 33 formed in a gap between the cylinder housing 81 and the clutch cover 6. However, the radially outwardly moving oil is prevented from intruding into the dry space in which the motor/generator 9 and the multiple-plate dry clutch 7 are arranged because of the sealing action of the first seal member 31 arranged in the gap between the cylinder housing 81 and the clutch cover 6. The leaked oil then passes through the first oil recovery passage 15a formed in the cylinder housing 81 and returns to the transmission 4. Thus, oil that leaks from a sliding portion of the piston 82 can be returned to the transmission 4 while being prevented from entering the dry space where the multiple-plate dry clutch 7 and the motor/generator 9 are arranged.

Now, operational effects related to recovering operating oil that has leaked from a sliding portion of the piston arm 83 will be explained. A portion of the operating oil flowing through the second oil recovery passage 33 penetrates into a sliding portion of the piston arm 83 and leaks into a space that is sealed off by the elastic partitioning member (the pressure plate 88 and the elastic support plate 89). A centrifugal force acts on the operating oil that leaks into the sealed space and the operating oil passes through the leakage oil passage 32 (which is arranged to pass through the clutch cover 6) and into the second oil recovery passage 33 (which is formed in a gap between the cylinder housing 81 and the clutch cover 6). Due to centrifugal force, the recovered operating oil then moves in a radially outward direction through the second oil recovery passage 33 (which is formed in a gap between the cylinder housing 81 and the clutch cover 6) and passes through the first oil recovery passage 15a formed in the cylinder housing 81 before returning to the transmission 4. Thus, oil that leaks from a sliding portion of the piston arm 83 can be returned to the transmission 4 while being prevented from entering the dry space where the multiple-plate dry clutch 7 and the motor/generator 9 are arranged.

Otherwise, the operational effects are the same as those obtained with the first embodiment.

Effects of the second embodiment will now be explained. Effects that can be obtained with a drive force transmitting apparatus according to the second embodiment are explained below.

(6) In the second embodiment, first bearings 12 are provided to rotatably support the clutch cover 6 with respect to the cylinder housing 81 and the leakage oil recovery path has the first oil recovery passage 15a formed in the cylinder housing 81 and the second oil recovery passage 33 formed by a gap between the cylinder housing 81 and the clutch cover 6. Oil that leaks from a sliding portion of the piston 82 passes through the second oil recovery passage 33 (which is sealed by a first seal member 31) and through the first oil recovery passage 15a and is returned to the transmission 4. Thus, in addition to the effect described in (1) of the first embodiment, the support action provided by the first bearings 12 helps prevent a rotational center axis of the clutch cover 6 from deviating with respect to a rotational center axis of the cylinder housing 81 and can improve the seal performance of the first seal member 31, which serves to prevent oil leaking from the second oil recover passage 33 (which is formed by a gap between the cylinder housing 81 and the clutch cover 6) from entering a dry space in which the dry clutch (multiple-plate dry clutch 7) is arranged.

(7) In addition to the first oil recovery passage 15a and the second oil recovery passage 33 (which is sealed by the first seal member 31), the leakage oil recovery path includes a leakage oil passage 32 that is arranged to pass through the clutch cover 6 and is sealed by an elastic partitioning member (e.g., the pressure plate 88 and the elastic support plate 89). Oil leaking from a sliding portion of the piston arm 83 passes through the leakage oil passage 32, the second oil recovery passage 33, and the first oil recovery passage 15a and is returned to the transmission 4. Thus, in addition to the effect described in (6) above, oil leaking from a sliding portion of the piston arm 83 can be returned to the transmission 4 while being prevented from intruding into the dry space.

(8) In the second embodiment, the first seal member 31 and the first oil recovery passage 15a are arranged in positions located radially outward from sliding portions of the piston 82 and the piston arm 83, and the second oil recovery passage 33 (which is formed by a gap between the cylinder housing 81 and the clutch cover 6) is arranged to extend generally in a radially outward direction from the sliding portions of the piston 82 and the piston arm 83. As a result, in addition to the effects described in (6) and (7) above, oil that leaks from a sliding portion of the piston 82 and a sliding portion of the piston arm 83 can be returned to the transmission 4 quickly by utilizing the centrifugal force acting on the leaked oil.

While only selected embodiments have been chosen to illustrate the present invention, it will be apparent to those skilled in the art from this disclosure that various changes and modifications can be made herein without departing from the scope of the invention as defined in the appended claims. For example, although the dry clutch is exemplified with a multiple-plate dry clutch in first and second embodiments, it is also acceptable to use a single-plate dry clutch. Also although a motor rotor is fixed to the clutch cover in the first and second embodiments, it is acceptable for a motor rotor not to be fixed to the clutch cover. In other words, it is acceptable for the invention to be applied to a drive force transmitting apparatus that does not have a motor/generator. In the first and second embodiments, the dry clutch is contrived to be normally open. However, it is acceptable for the dry clutch to be a normally closed clutch that uses a diaphragm spring or other such mechanism. The first and second embodiments present examples of are hybrid drive force transmitting apparatuses that each includes an engine and a motor/generator and uses a dry clutch as a drive mode transition clutch. However, the drive force transmitting apparatus can also be applied to an engine drive force transmitting apparatus that is equipped with only an engine as a drive power source and uses a dry clutch as a movement starting clutch. Also, the drive force transmitting apparatus can also be an electric drive force transmitting apparatus that is equipped with only a motor/generator as a drive power source and uses a dry clutch as a vehicle movement clutch. In short, the present disclosure can be applied to any drive force transmitting apparatus that uses a dry clutch operated by a hydraulic actuator upstream of a transmission.

Thus, the foregoing descriptions of the embodiments according to the present invention are provided for illustration only, and not for the purpose of limiting the invention as defined by the appended claims and their equivalents.

What is claimed is:

1. A drive force transmitting apparatus comprising:
   a dry clutch including a clutch hub, a first dry frictional holding member mounted on the clutch hub, a clutch cover having a transmission input shaft connecting structure configured to be connected to an input shaft of a transmission, and a second dry frictional holding member mounted on the clutch cover;
   a hydraulic cylinder including a piston slidably arranged inside a cylinder bore of a cylinder housing, the cylinder housing being rotatable relative to the clutch cover, the hydraulic cylinder controlling connection and release of the dry clutch by using hydraulic pressure from the transmission to move the piston;
   a piston arm slidably disposed between the piston and the dry clutch such that the piston arm is slidably arranged in a through hole formed in the clutch cover to generate a pressing force in the dry clutch from a pushing force from the piston;
   an elastic partitioning member disposed between the piston arm and the dry clutch, the elastic partitioning member preventing lubricating fluid that has leaked from a sliding portion of the piston arm from flowing into the dry clutch;
   a first seal member disposed downstream from the elastic partitioning member in a leakage flow direction of lubricating fluid that has leaked past the piston, the first seal member sealing between opposing surfaces of the cylinder housing and the clutch cover; and
   a leakage lubricating fluid recovery path being at least partially formed by a gap between the cylinder housing and the clutch cover, such that lubricating fluid leaking past the piston is conveyed to an inside of the transmission while maintaining a sealed state established by the elastic partitioning member and the first seal member.

2. The drive force transmitting apparatus as recited in claim 1, wherein
   the hydraulic cylinder has a hydraulic fluid chamber that is arranged to be in fluid communication with the transmission such that hydraulic fluid is shared by both the transmission and the hydraulic cylinder.

3. The drive force transmitting apparatus as recited in claim 1, wherein the cylinder housing is disposed between the transmission and the clutch cover as viewed along a direction parallel to an axial direction of the input shaft of the transmission.

4. The drive force transmitting apparatus as recited in claim 1, wherein
the first seal member is disposed radially spaced from the piston with respect to an axial direction of the input shaft of the transmission.

5. A drive force transmitting apparatus comprising:
a dry clutch including a clutch hub, a first dry frictional holding member mounted on the clutch hub, a clutch cover having a transmission input shaft connecting structure configured to be connected to an input shaft of a transmission, and a second dry frictional holding member mounted on the clutch cover;
a hydraulic cylinder including a piston slidably arranged inside a cylinder bore of a cylinder housing, the clutch cover being rotatably supported with respect to the cylinder housing by a first bearing, the hydraulic cylinder controlling connection and release of the dry clutch by using hydraulic pressure from the transmission to move the piston;
a piston arm slidably disposed between the piston and the dry clutch such that the piston arm is slidably arranged in a through hole formed in the clutch cover to generate a pressing force in the dry clutch from a pushing force from the piston;
an elastic partitioning member disposed between the piston arm and the dry clutch, the elastic partitioning member preventing lubricating fluid that has leaked from a sliding portion of the piston arm from flowing into the dry clutch;
a first seal member disposed downstream from the elastic partitioning member in a leakage flow direction of lubricating fluid that has leaked past the piston, the first seal member sealing between opposing surfaces of the cylinder housing and the clutch cover; and
a leakage lubricating fluid recovery path being at least partially formed by a gap between the cylinder housing and the clutch cover, such that lubricating fluid leaking past the piston is conveyed to an inside of the transmission while maintaining a sealed state established by the elastic partitioning member and the first seal member,
the leakage lubricating fluid recovery path including a first lubricating fluid recovery passage formed in the cylinder housing such that lubricating fluid that leaks past the piston returns to the transmission by passing through the gap between the cylinder housing and the clutch cover and through the first lubricating fluid recovery passage.

6. A drive force transmitting apparatus comprising:
a dry clutch including a clutch hub, a first dry frictional holding member mounted on the clutch hub, a clutch cover having a transmission input shaft connecting structure configured to be connected to an input shaft of a transmission, and a second dry frictional holding member mounted on the clutch cover;
a hydraulic cylinder including a piston slidably arranged inside a cylinder bore of a cylinder housing, the clutch cover being rotatably supported with respect to the cylinder housing by a first bearing, the hydraulic cylinder controlling connection and release of the dry clutch by using hydraulic pressure from the transmission to move the piston;
a piston arm slidably disposed between the piston and the dry clutch such that the piston arm is slidably arranged in a through hole formed in the clutch cover to generate a pressing force in the dry clutch from a pushing force from the piston;
an elastic partitioning member disposed between the piston arm and the dry clutch, the elastic partitioning member preventing lubricating fluid that has leaked from a sliding portion of the piston arm from flowing into the dry clutch;
a first seal member disposed downstream from the elastic partitioning member in a leakage flow direction of lubricating fluid that has leaked past the piston, the first seal member sealing between opposing surfaces of the cylinder housing and the clutch cover; and
a leakage lubricating fluid recovery path being at least partially formed by a gap between the cylinder housing and the clutch cover, such that lubricating fluid leaking past the piston is conveyed to an inside of the transmission while maintaining a sealed state established by the elastic partitioning member and the first seal member,
the leakage lubricating fluid recovery path including a first lubricating fluid recovery passage formed in the cylinder housing and a second lubricating fluid recovery passage formed by the gap between the cylinder housing and the clutch cover and sealed by the first seal member such that lubricating fluid that leaks past the piston returns to the transmission by passing through the first and second lubricating fluid recovery passages.

7. The drive force transmitting apparatus as recited in claim 6, wherein
the leakage lubricating fluid recovery path further includes a leakage lubricating fluid passage passing through the clutch cover and is sealed by the elastic partitioning member such that lubricating fluid that leaks past the piston arm returns to the transmission by passing through the leakage lubricating fluid passage and the first and second lubricating fluid recovery passages.

8. The drive force transmitting apparatus as recited in claim 6, wherein
the first seal member and the first lubricating fluid recovery passage are disposed radially outward from a sliding portion of the piston and the sliding portion of the piston arm, and
the second lubricating fluid recovery passage extends radially from the sliding portions of the piston and the piston arm to the first lubricating fluid recovery passage.

9. A drive force transmitting apparatus comprising:
a dry clutch including a clutch hub, a first dry frictional holding member mounted on the clutch hub, a clutch cover having a transmission input shaft connecting structure configured to be connected to an input shaft of a transmission, and a second dry frictional holding member mounted on the clutch cover;
a hydraulic cylinder including a piston slidably arranged inside a cylinder bore of a cylinder housing, the hydraulic cylinder controlling connection and release of the dry clutch by using hydraulic pressure from the transmission to move the piston;
a first bearing rotatably supporting the clutch cover with respect to the cylinder housing;
a second bearing disposed between axially opposing surfaces of the clutch hub and the clutch cover;
a piston arm slidably disposed between the piston and the dry clutch such that the piston arm is slidably arranged in a through hole formed in the clutch cover to generate a pressing force in the dry clutch from a pushing force from the piston;

a third bearing disposed between the piston and the piston arm;

an elastic partitioning member disposed between the piston arm and the dry clutch, the elastic partitioning member preventing lubricating fluid that has leaked from a sliding portion of the piston arm from flowing into the dry clutch;

a first seal member disposed downstream from the elastic partitioning member in a leakage flow direction of lubricating fluid that has leaked past the piston, the first seal member sealing between opposing surfaces of the cylinder housing and the clutch cover;

a second seal member disposed between the clutch hub and the clutch cover to seal a portion of a bearing lubricating fluid path such that lubricating fluid passes through the second bearing; and a leakage lubricating fluid recovery path being at least partially formed by a gap between the cylinder housing and the clutch cover, such that lubricating fluid leaking past the piston is conveyed to an inside of the transmission while maintaining a sealed state established by the elastic partitioning member and the first seal member, the first, second and third bearings being disposed such that lubricating fluid from the transmission lubricates the first, second and third bearings, the second bearing being further disposed in the bearing lubricating fluid path such that lubricating fluid leaking past the piston is conveyed through the second bearing to the inside of the transmission by the bearing lubricating fluid path.

10. The drive force transmitting apparatus as recited in claim 9, wherein the bearing lubricating fluid path includes
- a first axial lubricating fluid passage extending axially through the transmission input shaft,
- a second axial lubricating fluid passage extending axially through the clutch cover and fluidly communicating with the first axial lubricating fluid passage,
- a lubricating fluid passage extending through the clutch cover and fluidly communicating with the second axial lubricating fluid passage through the second bearing, and
- a gap extending between the clutch hub and the clutch cover.

* * * * *